United States Patent [19]
Perry, Sr. et al.

[11] 4,036,249
[45] July 19, 1977

[54] DIVERTER VALVE

[76] Inventors: Carlos V. Perry, Sr., 8805 Early St.; Carlos V. Perry, Jr., 9304 Stuart Ave.; Christopher G. Perry, 7452 Carlton Lane, all of Manassas, Va. 22110

[21] Appl. No.: 745,763

[22] Filed: Nov. 29, 1976

[51] Int. Cl.² .......................................... F16K 11/07
[52] U.S. Cl. ................................ 137/367; 137/371; 137/556.3; 137/625.47; 251/287
[58] Field of Search ............... 137/364, 367, 368, 369, 137/370, 371, 556.3, 556.6, 625.47; 251/287

[56] References Cited

U.S. PATENT DOCUMENTS

| | | | |
|---|---|---|---|
| 3,233,865 | 2/1966 | Panzica et al. | 137/625.47 |
| 3,572,383 | 3/1971 | Natalizia | 137/625.47 |

FOREIGN PATENT DOCUMENTS

| | | | |
|---|---|---|---|
| 1,255,424 | 11/1967 | Germany | 137/625.47 |

OTHER PUBLICATIONS

Franklin Research Bulletin, "Effluent Diversion Valve", 1 page.

*Primary Examiner*—Alan Cohan
*Assistant Examiner*—Gerald A. Michalsky
*Attorney, Agent, or Firm*—John H. Merchant

[57] ABSTRACT

A diverter valve, particularly adapted for use in septic systems, for controlling the flow of effluent from a septic tank to a plurality of leach beds, comprising a thick-walled valve body of cast urethane having a deep circular groove in the upper surface to receive a section of a capped pipe to afford access to the valve control from ground level, and having a centrally and vertically disposed valve chamber provided with an inlet port and a plurality of outlet ports, rigid integrally cast webs extending from the top to the bottom walls of the valve body dividing the same into separate inlet and outlet chambers communicating with the central valve chamber, oppositely disposed circular openings in the top and bottom walls of the valve body, the walls of the openings providing bearing surfaces for a tapered valve plug of cast urethane having top and bottom circular sections and having a cut-away central section providing a passageway for alternatingly connecting the inlet port with one of the outlet ports. The valve plug has at its upper end an integrally cast short shaft extending above the top surface of the valve body, a cast urethane cap having a central opening to receive the valve plug shaft, the cap being removably attached to the valve body to maintain the valve plug in position, and a knob cast into the valve plug shaft, cooperating with a groove in the cap to limit the rotation of the valve plug and insure proper alignment of the passageway in the valve plug with the inlet and outlet ports in the valve body.

5 Claims, 6 Drawing Figures

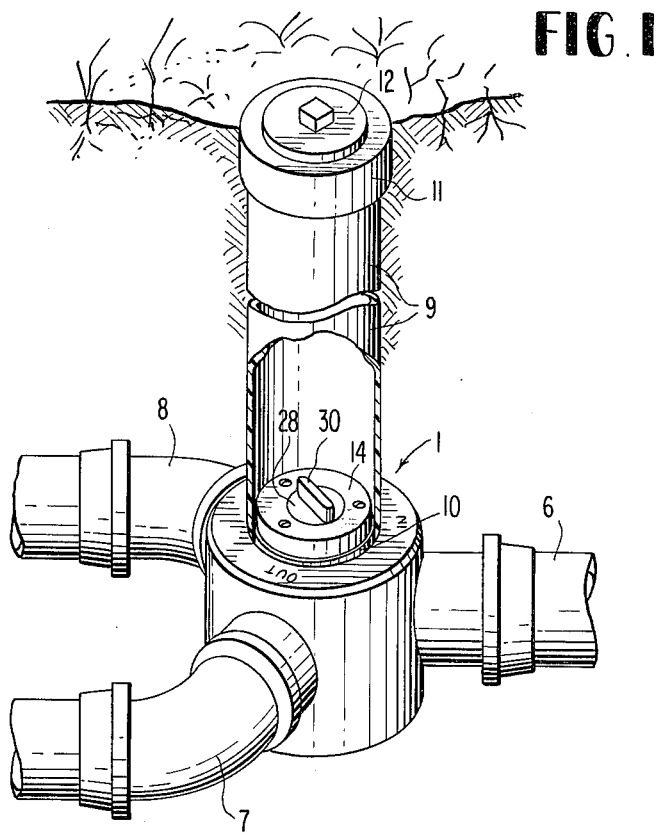
FIG.1
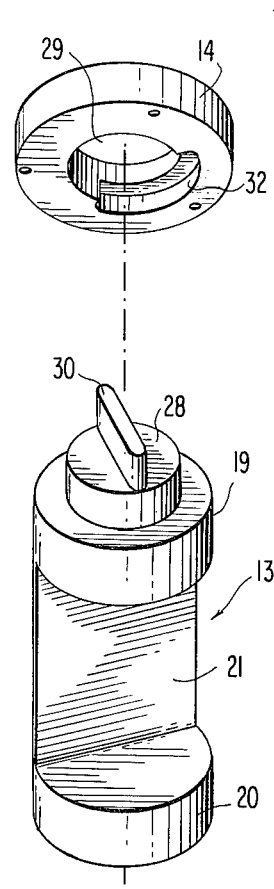
FIG.2
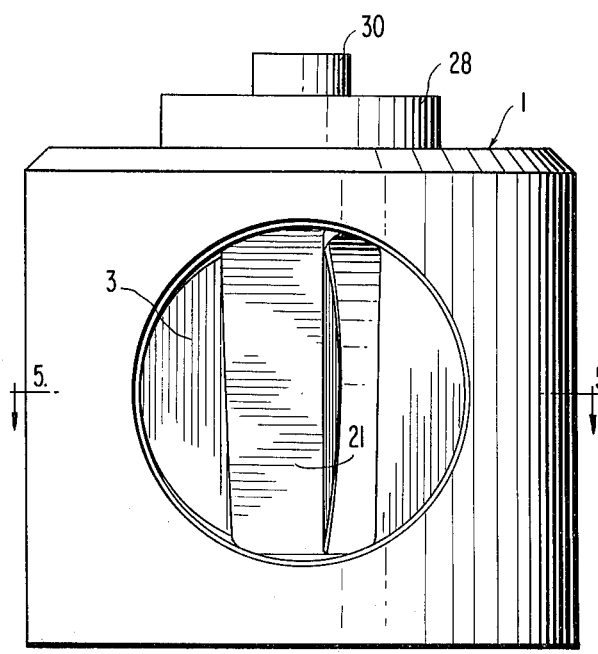
FIG.3
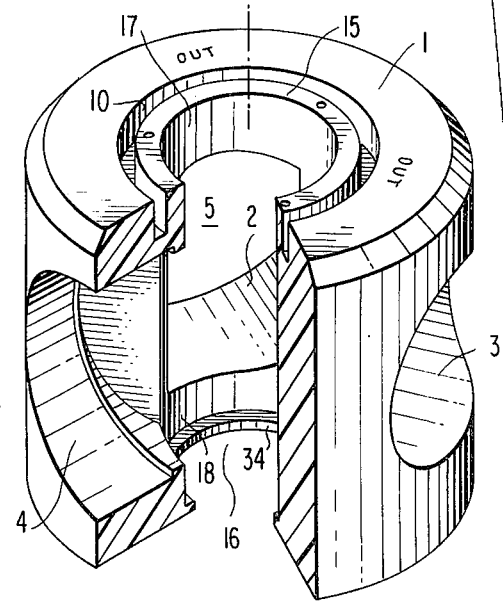

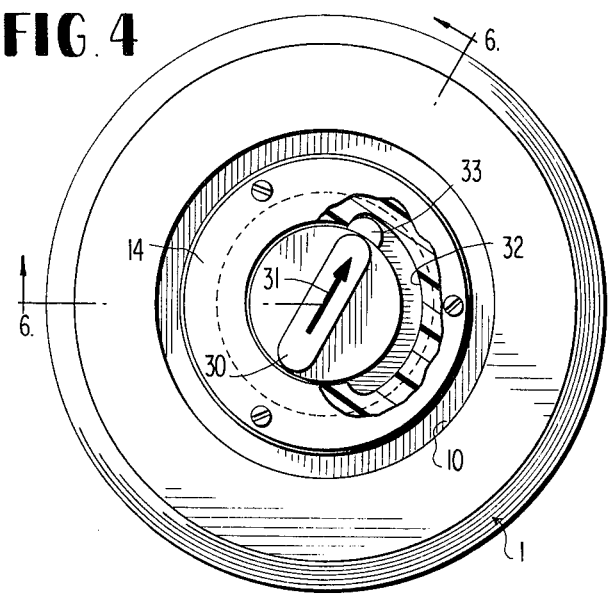
FIG. 4
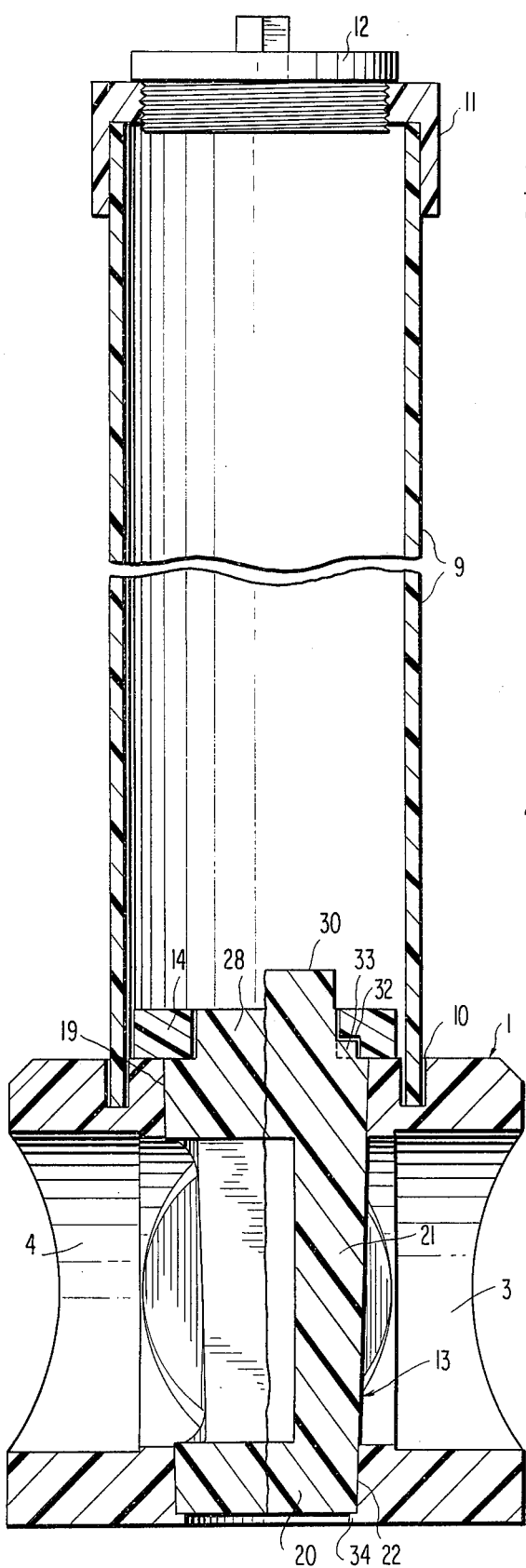
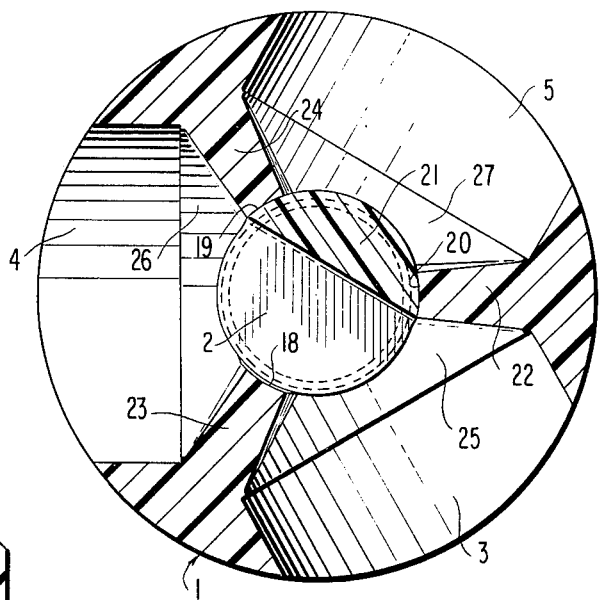
FIG. 5
FIG. 6

4,036,249

DIVERTER VALVE

BACKGROUND OF THE INVENTION

This invention relates to a liquid flow-control diverter valve designed for trouble-free efficient service with minimum maintenance over extended periods of use under the adverse conditions encountered in septic field installations. Valves designed for such use, being installed underground, are not readily accessible and failure to function properly usually results in an expensive repair bill.

Valves of the type in question are particularly adapted for use in septic systems for controlling the flow of effluent from a septic tank to a plurality of leach or drain fields, although such valves will serve effectively in any underground installation which operates at minimum pressure.

Recent research has demonstrated that in septic tank installations, it is preferable to employ a plurality of leach beds or drain fields and to employ means to alternate the flow of effluent at periodic intervals, usually from six months to a year, between the different fields or beds. This practice enables the beds not in use to "rest" and regain their original efficiency. While the following description deals essentially with installations comprising a septic tank and two leach beds or drain fields, it will be apparent that the herein described valve may be used in a system in which more than two beds or fields may be used.

Diverter valves used in septic fields are subject to adverse operating conditions and it is essential that such valves be simple in construction and resistant to all types of deterioration to insure continuous trouble-free operation in order to keep maintenance costs as low as possible. In addition, the number of basic parts comprising the valve body should be few in number and simple in design so as to be readily manufactured to keep costs within reasonable limits and therefore compatible with septic field installations.

BRIEF DESCRIPTION OF THE INVENTION

Our improved diverter valve comprises a relatively heavy thick-walled cast urethane body, generally circular in cross-section, having a vertically disposed central cylindrical chamber, the valve body having an inlet port and a plurality of outlet ports.

While the present description and the accompanying drawing depict a valve body having two outlet ports, it will be apparent that additional outlet ports may be provided, if desired.

The valve body is provided with three heavy, integrally cast, downwardly tapered ribs extending from the top wall to the bottom wall of the valve body, dividing the same into three substantially uniform chambers, one of which communicates with the inlet port of the valve body, the other two chambers communicating with the outlet ports. All three of these chambers open directly into the central chamber.

Centrally and oppositely disposed openings in the top and bottom walls of the valve body provide bearing surfaces for a vertically mounted valve plug. The valve plug comprises a unitary urethane casting having circular top and bottom sections providing a sliding and sealing contact with the upper and lower bearing surfaces of the inner walls of the valve body. The valve plug has a cut-away central section providing a passageway for alternately connecting the inlet port with one of the outlet ports while closing the other outlet port. The outer surface of the central portion of the valve plug is slightly tapered downwardly so as to be in slidable and sealing contact with the correspondingly tapered outer surfaces of the ribs or webs defining the inlet and outlet chambers.

A cast urethane cap is secured to the upper surface of the valve body by suitable fastening means, such as screws, to maintain the valve plug in operating position against upward displacement.

The valve plug has an integrally cast shaft extending through the central opening and above the top of the valve body and through a central opening in the cast retainer cap. The upper shaft of the valve plug has an upwardly extending projection adapted to fit a slotted tool or rod of sufficient length to rotate the valve plug from ground level.

The cast urethane cap is provided with a slot or groove adjacent the central opening therein, cooperating with a knob or projection molded into the shaft of the valve plug to limit the movement of the valve plug and insure proper alignment between the inlet and outlet openings in the valve body.

The upper surface of the valve body has a deep circular groove adapted to receive a section of pipe to provide access to the means for rotating the valve plug, the length of the pipe depending upon the depth the valve is installed.

The top of the length of pipe is sealed by a cap provided with a threaded plug and all joints are preferably sealed to afford protection against surface water.

BRIEF DESCRIPTION OF THE DRAWINGS

FIG. 1 is a prospective view, partly in section, showing the diverter valve with access pipe, as installed in a septic field, having an inlet from a septic tank and two outlets to a drain bed.

FIG. 2 is an exploded view showing the relationship between the three major components of the valve, namely, the cap, the valve plug, and the valve body.

FIG. 3 is a side view of the valve, showing one of the ports.

FIG. 4 is a top plan view of the valve body, partly in section, showing the means for limiting the rotation of the valve plug.

FIG. 5 is a sectional view taken along the lines 5 — 5 of FIG. 3, showing the operating relation between the webs of the valve body defining the three chambers, and the valve plug.

FIG. 6 is a sectional view of the valve and access pipe, taken along lines 6 — 6 of FIG. 4.

DETAILED DESCRIPTION OF THE VALVE

The present invention relates to an improved diverter valve, primarily intended and designed for use in septic field installations for alternately controlling the flow of effluent from a septic tank to a plurality of lines constituting a filter bed or drain field. It comprises a relatively thick-walled cast urethane body or casing 1, having a centrally disposed chamber 2, an inlet port 3, and a plurality of outlet ports, 4, and 5.

FIG. 1 represents a typical septic field installation incorporating our improved diverter valve. The valve is buried, usually at a depth of several feet, the inlet port 3, being connected with a septic tank (not shown), by the pipe 6, pipes 7, and 8, connecting the outlet ports 4, and 5, of the valve with the lines constituting the filter bed or drain field.

In order to provide access to the valve to operate the same, a section of pipe 9, preferably plastic, rests in a groove 10, in the upper surface of the valve body 1, extends upwardly to ground level, and is closed by a cap 11, provided with a threaded plug 12. The joints between the section of pipe 9, and the groove 10, and between the pipe 9, and the cap 11, are preferably sealed to exclude ground water.

The exploded view in FIG. 2 illustrates the simplicity of our improved diverter valve design and of the operating relation between the three major components of the valve, namely, the valve body 1, the valve plug 13, and the cap 14, all cast from urethane.

We have found cast urethane to be an ideal material for the fabrication of our improved diverter valve since it is extremely resistant to the adverse conditions encountered in underground installations and when so used is practically indestructible. The three major components may be readily cast to the precise dimensions required, the resulting castings presenting a smooth attractive finish, the interior surface of the valve body offering a minimum resistance to the flow of effluent.

The valve body 1, as shown in FIG. 2, has centrally disposed circular openings, 15, and 16, oppositely positioned, respectively, in the top and bottom walls of the valve body, adapted to receive a unitary cast urethane valve plug 13, the interior walls of the circular openings serving as bearing surfaces for rotatable vertical mounting of the said valve plug.

The structure of the valve plug is clearly depicted in FIG. 2 of the drawings, and comprises circular and slightly tapered top and bottom sections, 19, and 20, providing rotatable and sealing contact with the upper and lower bearing surfaces, 17 and 18, respectively, of the valve body.

The valve plug 13, has a cut-away central section 21, providing a passageway for alternately connecting the inlet port 3, with one of the other outlet ports, 4, or 5, while closing the other outlet port.

As shown in FIG. 5, the valve body 1, is provided with three integrally cast, downwardly tapered ribs, 22, 23, and 24, dividing the central chamber 2, into three substantially uniform chambers, 25, 26, and 27, the first of which communicates with the inlet port 3, the second communicating with the outlet port 4, while the latter chamber communicates with the outlet port 5. Chamber 25, opens directly into central chamber 2, as do chambers 26, and 27, except when one or the other of these chambers is closed by the valve plug 13. The center tapered section, 21, of the valve plug 13, is in rotatable and sliding contact with the correspondingly tapered projecting surfaces of webs 22, and 24, when the outlet to port 5, is closed, as depicted in FIG. 5, or in like contact with webs 23, and 24, depending upon the position of the valve plug 13.

The valve plug 13, has an integrally cast relatively short upper shaft or extension 28, passing through the central opening 15, in the top of the valve body 1, and through a central opening 29, in the cast urethane cap 14. The upper shaft or extension 28 of the valve plug 13, is provided with an upwardly extending projection 30, adapted to fit a slotted tool or rod (not shown) of sufficient length to rotate the valve plug from ground level. A suitable device, such as an arrow 31, is molded into the top of projection 30, to indicate the position of the valve plug.

The cap 14, which is secured to the valve body by suitable fastening means, such as screws, (not shown) has a slot 32, adjacent the central opening 29, cooperating with a small knob or projection 33, cast on the shaft 28, of the valve plug 13, to limit the movement of the valve plug and insure proper alignment of the valve plug with the inlet and outlet openings in the valve body.

As shown in FIG. 2, a ledge 34, surrounding the opening 16, in the bottom of the valve body, provides an additional bearing surface for the bottom section 20, of the valve plug 13. This additional bearing surface, along with the cooperating tapered bearing surfaces 16, and 17, and webs 22, 23, and 24, of the valve body, prevent jamming of the valve plug, even when excessive pressure is applied to the top of the valve plug when rotating the same.

The simple design and construction of our improved diverter valve, which comprises only three major components, namely, the valve body, the valve plug, and retainer cap, each major component being cast from practically indestructible urethane, insures trouble-free operation over extended periods of service. Since the major components may be readily cast, the need for expensive machining operations is eliminated, thus facilitating fabrication and keeping manufacturing costs at a minimum.

Urethane has been previously used in casting certain components for valves of the type in question but the designs have proved to be defective in that the valve plugs have a tendency to jam and where metal stub-shafts are molded into the upper end of the valve plug, breakage occurs when pressure is applied to operate the valve. Our improved design eliminates these basic objections and results in a product in which maintenance costs are kept at a minimum even under severe service conditions.

Our invention has been described with reference to the preferred embodiments thereof, but it will be understood that variations and changes, obvious to those skilled in the art, may be made within the spirit and scope of the appended claims.

We claim:

1. A diverter valve for underground installations operating at relatively low pressures for controlling the flow of effluent from a septic tank to a plurality of leach beds, having a valve body, a valve plug, and a retainer cap for the valve plug, comprising;

a thick-walled valve body of cast urethane defining a vertically disposed cylindrical central valve chamber having an inlet port and a plurality of spaced outlet ports, centrally disposed circular openings in the top and bottom walls of the valve body, the walls of which provide bearing surfaces for a tapered valve plug, integrally cast downwardly tapered and uniformly spaced heavy ribs extending from the top to the bottom walls of the valve body dividing the central chamber into a plurality of substantially uniform smaller chambers communicating directly with the central chamber, a valve plug comprising a unitary urethane casting having circular top and bottom sections rotatively mounted for sealing contact with the upper and lower bearing surfaces of the valve body, the valve body having a cut-away center section providing a passageway for alternately connecting the inlet port with one of the outlet ports, the remaining center portion of the valve plug being in slidable and sealing contact with at least two of the ribs to close at least one of the outlets while one outlet remains open, the valve plug having an integrally cast shaft at the upper end thereof, said shaft extending through the upper central opening in the top of the valve body and through an opening in the retainer cap, the upper end of the shaft having an upwardly extending projection adapted to receive a slotted tool to actuate the plug from ground level, and a circular groove in the top surface of the valve body adapted to receive a section of pipe, closed with a cap provided with a screw-threaded plug to afford access to the valve plug for operating the same.

2. A diverter valve as defined in claim 1, having an inlet port and two outlet ports.

3. A diverter valve as defined in claim 2, in which the inlet port and the outlet ports are spaced 120° apart.

4. A diverter valve as defined in claim 1, in which the shaft of the upper end of the valve plug has a cast knob cooperating with a groove in the lower surface of the cap limiting the rotation of the valve plug and providing proper alignment of the passageway in the valve plug with the inlet port and an outlet port in the valve body.

5. A diverter valve as defined in claim 4, in which indicia are cast in the valve body to designate the inlet port and the outlet ports, and on the upper end of the valve plug to indicate the position of said plug.

* * * * *

UNITED STATES PATENT OFFICE
CERTIFICATE OF CORRECTION

Patent No. 4,036,249　　　　　　　　　　Dated　July 19, 1977

Inventor(s) Carlos V. Perry, Sr., et al.

It is certified that error appears in the above-identified patent and that said Letters Patent are hereby corrected as shown below:

Claim 1, column 4, line 64, "body" should read -- plug --.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*